United States Patent
An et al.

(10) Patent No.: US 11,418,095 B2
(45) Date of Patent: Aug. 16, 2022

(54) MOTOR ASSEMBLING METHOD, CENTERING JIG, AND ELECTRIC MOTOR

(71) Applicant: MITSUBISHI HEAVY INDUSTRIES ENGINE & TURBOCHARGER, LTD., Sagamihara (JP)

(72) Inventors: Byeongil An, Kanagawa (JP); Naomichi Shibata, Kanagawa (JP); Yukio Yamashita, Tokyo (JP)

(73) Assignee: MITSUBISHI HEAVY INDUSTRIES ENGINE & TURBOCHARGER, LTD., Sagamihara (JP)

(\*) Notice: Subject to any disclaimer, the term of this patent is extended or adjusted under 35 U.S.C. 154(b) by 285 days.

(21) Appl. No.: 16/626,402

(22) PCT Filed: Aug. 25, 2017

(86) PCT No.: PCT/JP2017/030591
§ 371 (c)(1),
(2) Date: Dec. 24, 2019

(87) PCT Pub. No.: WO2019/038921
PCT Pub. Date: Feb. 28, 2019

(65) Prior Publication Data
US 2020/0204051 A1    Jun. 25, 2020

(51) Int. Cl.
*H02K 15/16*   (2006.01)
*B21D 43/00*   (2006.01)
(Continued)

(52) U.S. Cl.
CPC ........... *H02K 15/16* (2013.01); *B21D 43/003* (2013.01); *F02B 33/40* (2013.01); *H02K 5/1732* (2013.01); *H02K 7/083* (2013.01); *H02K 9/22* (2013.01)

(58) Field of Classification Search
CPC ...... H02K 15/16; H02K 5/1732; H02K 7/083; H02K 9/22; B21D 43/003; F02B 33/40
(Continued)

(56) References Cited

U.S. PATENT DOCUMENTS 2,423,750 A \* 7/1947 Benson .................. H02K 15/16
29/596
6,181,038 B1 \* 1/2001 Van Rooij .............. H02K 1/185
310/216.137
(Continued)

FOREIGN PATENT DOCUMENTS

| CN | 101233669 A | 7/2008 |
| CN | 103649545 A | 3/2014 |

(Continued)

OTHER PUBLICATIONS

Extended European Search Report dated May 13, 2020, for corresponding European Patent Application No. 17922760.8.
(Continued)

*Primary Examiner* — Terrance L Kenerly
(74) *Attorney, Agent, or Firm* — Birch, Stewart, Kolasch & Birch, LLP

(57) ABSTRACT

A motor assembling method for an electric motor includes inserting a stator of the motor into a first housing of the motor through an opening of the first housing; fitting a shaft portion of a centering jig to an inner peripheral surface of the stator and a mounting portion of a first bearing of the motor in the first housing, and fitting a flange portion to the opening; fixing the stator on which centering is performed using the centering jig to the first housing; removing the centering jig from the first housing; and inserting a rotary shaft of the motor, the first bearing, and a second bearing of the motor into the first housing, and fixing a second housing of the motor to the opening.

7 Claims, 9 Drawing Sheets

(51) Int. Cl.
  *F02B 33/40*   (2006.01)
  *H02K 5/173*   (2006.01)
  *H02K 7/08*    (2006.01)
  *H02K 9/22*    (2006.01)

(58) Field of Classification Search
  USPC .......................................................... 310/51
  See application file for complete search history.

(56) References Cited

U.S. PATENT DOCUMENTS

| | | |
|---|---|---|
| 6,205,644 B1 | 3/2001 | Daniels et al. |
| 6,300,695 B1 | 10/2001 | Neal |
| 7,586,304 B2 | 9/2009 | Hashimoto et al. |
| 9,143,017 B2 * | 9/2015 | Horng .................... F16C 17/02 |
| 9,470,140 B2 | 10/2016 | An et al. |
| 2007/0130753 A1 | 6/2007 | Hashimoto et al. |
| 2014/0090626 A1 | 4/2014 | An et al. |
| 2017/0204868 A1 | 7/2017 | Oshita et al. |

FOREIGN PATENT DOCUMENTS

| | | |
|---|---|---|
| CN | 204408074 U | 6/2015 |
| CN | 105191084 A | 12/2015 |
| JP | 58-103570 U | 7/1983 |
| JP | 2-107243 U | 8/1990 |
| JP | 7-31109 A | 1/1995 |
| JP | 9-103041 A | 4/1997 |
| JP | 10-295050 A | 11/1998 |
| JP | 11-27912 A | 1/1999 |
| JP | 2000-78797 A | 3/2000 |
| JP | 2005-6388 A | 1/2005 |
| JP | 2009-95184 A | 4/2009 |
| JP | 2009-207212 A | 9/2009 |
| JP | 4826429 B2 | 11/2011 |
| JP | 5535992 B2 | 7/2014 |
| JP | 2015-162996 A | 9/2015 |
| JP | 2016-20650 A | 2/2016 |
| WO | WO 2014/174552 A1 | 10/2014 |

OTHER PUBLICATIONS

Chinese Office Action and Search Report for Chinese Application No. 201780092536.2, dated Jan. 5, 2021.

Written Opinion of the International Searching Authority and English translation of the International Search Report, dated Nov. 21, 2017, for International Application No. PCT/JP2017/030591 with an English translation of the Written Opinion of the International Searching Authority.

* cited by examiner

MOTOR ASSEMBLING METHOD, CENTERING JIG, AND ELECTRIC MOTOR

TECHNICAL FIELD

The present invention relates to a motor assembling method for a motor applicable to an electric turbocharger, a centering jig used for the motor assembling method, and an electric motor assembled using the motor assembling method.

BACKGROUND ART

An electric turbocharger drives a compressor by using an electric motor. In this manner, the electric turbocharger suctions external air, pressurizes the air into compressed air by using an impeller, and supplies the compressed air to an internal combustion engine. The electric motor applicable to the electric turbocharger is configured as follows. A rotary shaft having a rotor fixed thereto is rotatably supported by a center portion of a housing, and a stator is fixed to the housing so as to be located around the rotor. When the electric motor is assembled, in general, a ring-shaped stator is first inserted from one side in an axial direction in a cylindrical stator housing. Subsequently, the rotor is inserted into the center portion of the stator, and a bearing housing is fixed to an insertion opening of the stator housing.

For example, PTL 1 and PTL 2 below disclose each example of the electric turbocharger.

CITATION LIST

Patent Literature

[PTL 1] Japanese Patent No. 5535992
[PTL 2] Japanese Unexamined Patent Application Publication No. 2016-020650

SUMMARY OF INVENTION

Technical Problem

Incidentally, according to the above-described electric motor, it is important to assemble the rotor and the stator inside the housing so that shaft centers of the rotor and the stator coincide with each other. If the shaft centers of the rotor and the stator are misaligned with each other, clearance dimensions between an outer peripheral surface of the rotor and an inner peripheral surface of the stator are uneven in a circumferential direction. In this case, the electric motor is unbalanced due to a magnetic attractive force at a position in the circumferential direction, and the rotor is unstably rotated. Consequently, vibration increases, and noise is generated due to resonance with other components. In the related art, when the stator is inserted into the stator housing, centering is performed on the stator by fitting the outer peripheral surface of the stator to the inner peripheral surface of the stator housing. In addition, centering is performed on the rotor as follows. The rotor is inserted into the center portion of the stator, and the bearing housing is fitted into an opening of the stator housing. The rotary shaft of the rotor is supported by the bearing housing via a bearing. In this case, the centering is performed on the rotor and the stator at mutually different positions. Thus, it is difficult to set highly accurate coaxial degree. In addition, when the stator is fitted into the stator housing, the outer peripheral surface of the stator deforms, and highly accurate centering cannot be performed on the stator. Consequently, it is difficult to set the highly accurate coaxial degree between the stator and the rotor.

The present invention is made in order to solve the above-described problems, and an object thereof is to provide a motor assembling method, a centering jig, and an electric motor in which noise generation is prevented by improving assembling accuracy and ensuring a highly accurate coaxial degree between a rotor and a stator.

Solution to Problem

According to the present invention, in order to achieve the above-described object, there is provided a motor assembling method for an electric motor including a first housing having an opening disposed on one side in an axial direction, a rotary shaft having a rotor, and located along the axial direction in a center portion inside the first housing, a stator located around the rotor inside the first housing, a second housing fixed to the opening, and a first bearing and a second bearing which are disposed in the first housing and the second housing, and which rotatably support each end portion of the rotary shaft in the axial direction. The motor assembling method includes a step of inserting the stator into the first housing through the opening, a step of fitting a shaft portion of a centering jig to an inner peripheral surface of the stator and a mounting portion of the first bearing in the first housing, and fitting a flange portion to the opening, a step of fixing the stator on which centering is performed using the centering jig to the first housing, a step of removing the centering jig from the first housing, and a step of inserting the rotary shaft, the first bearing, and the second bearing into the first housing, and fixing the second housing to the opening.

Therefore, the centering jig is positioned in at least two locations for the first housing in such a way that the shaft portion is fitted to the mounting portion of the first housing and the flange portion is fitted to the opening. The stator is positioned in the centering jig in such a way that the shaft portion is fitted to the inner peripheral surface of the stator. Therefore, the stator is positioned in the first housing via the centering jig. Then, the stator is fixed to the first housing in a state where the stator is positioned in the first housing. Thereafter, the centering jig is removed from the first housing, and the rotary shaft is located inside the first housing by inserting the rotor into the inner peripheral surface of the stator. In this manner, the rotary shaft is positioned for the inner peripheral surface of the stator via the rotor. As a result, the rotor and the stator of the rotary shaft are concentrically arranged. Accordingly, assembling accuracy is improved, and thus, a highly accurate coaxial degree is ensured between the rotor and the stator. Therefore, it is possible to assemble the electric motor which prevents noise from being generated when the electric motor is driven.

In the motor assembling method according to the present invention, after the centering jig is inserted into the first housing, the stator may be pressed against the first housing in the axial direction by a pressing member, and the stator may be fixed to the first housing in this state.

Therefore, the stator inside the first housing is pressed against the first housing by the pressing member. Accordingly, the stator can be highly accurately fixed to the first housing without causing any misalignment.

In the motor assembling method according to the present invention, after the centering jig is inserted into the first housing, the stator may be fixed to the first housing by filling

} a clearance between an outer peripheral surface of the stator and an inner peripheral surface of the first housing with a thermal conduction member.

Therefore, in a state where the stator inside the first housing is positioned by the centering jig, the clearance between the outer peripheral surface of the stator and the inner peripheral surface of the first housing is filled with the thermal conduction member. In this manner, the thermal conduction member can prevent the misalignment of the stator which is highly accurately positioned in the first housing by using the centering jig.

In the motor assembling method according to the present invention, after the centering jig is inserted into the first housing, the stator may be fixed to the first housing by a fastening bolt.

Therefore, the stator is fixed to the first housing by the fastening bolt. In this manner, the stator inside the first housing is positioned by the centering jig, and the stator can be firmly fixed to the first housing.

In the motor assembling method according to the present invention, in the stator, a first insulation member and a second insulation member which have a ring shape may be fixed to each end portion in a stator body in the axial direction, and when the rotary shaft, the first bearing, and the second bearing are inserted into the first housing, the centering may be performed on the rotor by fitting each outer peripheral surface of the first bearing and the second bearing to each inner peripheral surface of the first insulation member and the second insulation member.

Therefore, the outer peripheral surface of the first bearing and the second bearing is fitted to the inner peripheral surface of the first insulation member and the second insulation member. In this manner, the centering is performed on the rotor. Accordingly, a simple configuration can ensure a highly accurate coaxial degree between the rotor and the stator.

In the motor assembling method according to the present invention, after the stator is inserted into the first housing, finishing may be performed on the inner peripheral surface of the first insulation member and the second insulation member, and the rotary shaft, the first bearing, and the second bearing may be inserted into the first housing.

Therefore, the outer peripheral surface of the first bearing and the second bearing is fitted to the inner peripheral surface of the first insulation member and the second insulation member which are subjected to finishing. In this manner, the rotor and the stator are concentrically arranged. Accordingly, a highly accurate coaxial degree between the rotor and the stator can be ensured by improving the assembling accuracy.

In the motor assembling method according to the present invention, when the rotary shaft, the first bearing, and the second bearing are inserted into the first housing, the centering may be performed on the rotor by fitting the outer peripheral surface of the rotor to the inner peripheral surface of the stator.

Therefore, the outer peripheral surface of the rotor is fitted to the inner peripheral surface of the stator. In this manner, the rotor and the stator are concentrically arranged. Accordingly, the highly accurate coaxial degree between the rotor and the stator can be ensured by improving the assembling accuracy.

In addition, according to the present invention, there is provided a centering jig used when assembling an electric motor including a first housing having an opening disposed on one side in an axial direction, a rotary shaft having a rotor, and located along the axial direction in a center portion inside the first housing, a stator located around the rotor inside the first housing, a second housing fixed to the opening, and a first bearing and a second bearing which are disposed in the first housing and the second housing, and which rotatably support each end portion of the rotary shaft in the axial direction. The centering jig includes a shaft portion fitted to an inner peripheral surface of the stator inserted into the first housing, a centering portion disposed in a tip portion in the shaft portion, and fitted to a mounting portion of the first bearing in the first housing, and a flange portion fitted to the opening.

Therefore, the centering portion is fitted to the mounting portion of the first housing, and the flange portion is fitted to the opening. In this manner, the centering jig is positioned at least two locations for the first housing, and the shaft portion is fitted to the inner peripheral surface of the stator. In this manner, the stator is positioned in the centering jig. Therefore, the stator is positioned in the first housing via the centering jig. Thereafter, the centering jig is removed from the first housing, and the rotary shaft is located inside the first housing by inserting the rotor into the inner peripheral surface of the stator. In this manner, the rotary shaft is positioned for the inner peripheral surface of the stator via the rotor. As a result, the rotor and the stator of the rotary shaft are concentrically arranged. Accordingly, the assembling accuracy is improved, and thus, the highly accurate coaxial degree is ensured between the rotor and the stator. Therefore, it is possible to easily and highly accurately assemble the electric motor which prevents noise from being generated when the electric motor is driven.

The centering jig according to the present invention may further include a pressing member capable of pressing the stator against the first housing in the axial direction.

Therefore, the stator inserted into the first housing is pressed against the first housing by the pressing member. Accordingly, in this state, the stator can be highly accurately and easily fixed to the first housing.

In addition, according to the present invention, there is provided an electric motor including a first housing having an opening disposed on one side in an axial direction, a rotary shaft having a rotor, and located along the axial direction in a center portion inside the first housing, a stator located around the rotor inside the first housing, a second housing fixed to the opening, a first bearing and a second bearing which are disposed in the first housing and the second housing, and which rotatably support each end portion of the rotary shaft in the axial direction, and a thermal conduction member located in a clearance between an outer peripheral surface of the stator and an inner peripheral surface of the first housing.

Therefore, the thermal conduction member is located in the clearance between the outer peripheral surface of the stator and the inner peripheral surface of the first housing. In this manner, the stator is closely fixed to the first housing. The vibration of the stator can be prevented. Accordingly, noise generation can be prevented by improving the assembling accuracy and ensuring the highly accurate coaxial degree between the rotor and the stator. In addition, heat generated in the stator is transferred and dissipated to the first housing via the thermal conduction member. Therefore, cooling performance of the stator can be improved.

In the electric motor according to the present invention, in the stator, a first insulation member and a second insulation member which have a ring shape may be fixed to each end portion in a stator body in the axial direction, a coil may be wound around the stator body, the first insulation member, and the second insulation member, an outer peripheral surface of the first bearing may be fitted to an inner peripheral surface of the first insulation member, and an outer peripheral surface of the second bearing may be fitted to an inner peripheral surface of the second insulation member.

Therefore, the outer peripheral surface of the first bearing is fitted to the inner peripheral surface of the first insulation member, and the outer peripheral surface of the second bearing is fitted to the inner peripheral surface of the second insulation member. In this manner, the shaft centers of the rotor and the stator can coincide with each other by ensuring high accuracy in machining the outer peripheral surface of each bearing and the inner peripheral surface of each insulation member. Accordingly, the assembling accuracy can be improved.

In the electric motor according to the present invention, any one of the inner peripheral surface of the first housing and the outer peripheral surface of the stator may have a plurality of protrusion portions coming into contact with the other of the inner peripheral surface of the first housing and the outer peripheral surface of the stator and disposed at a predetermined interval in a circumferential direction.

Therefore, the plurality of protrusion portions disposed in one of the inner peripheral surface of the first housing and the outer peripheral surface of the stator come into contact with the other. In this manner, it is possible to prevent resonance occurrence between the first housing and the stator.

Advantageous Effects of Invention

According to the motor assembling method, the centering jig, and the electric motor of the present invention, noise generation can be prevented by improving the assembling accuracy and ensuring the highly accurate coaxial degree between the rotor and the stator.

DESCRIPTION OF EMBODIMENTS

Hereinafter, preferred embodiments of a motor assembling method, a centering jig, and an electric motor according to the present invention will be described in detail with reference to the accompanying drawings. The present invention is not limited to the embodiments. In a case where the plurality of embodiments are provided, the present invention includes a configuration in which the respective embodiments are combined with each other.

First Embodiment

Figure 1:
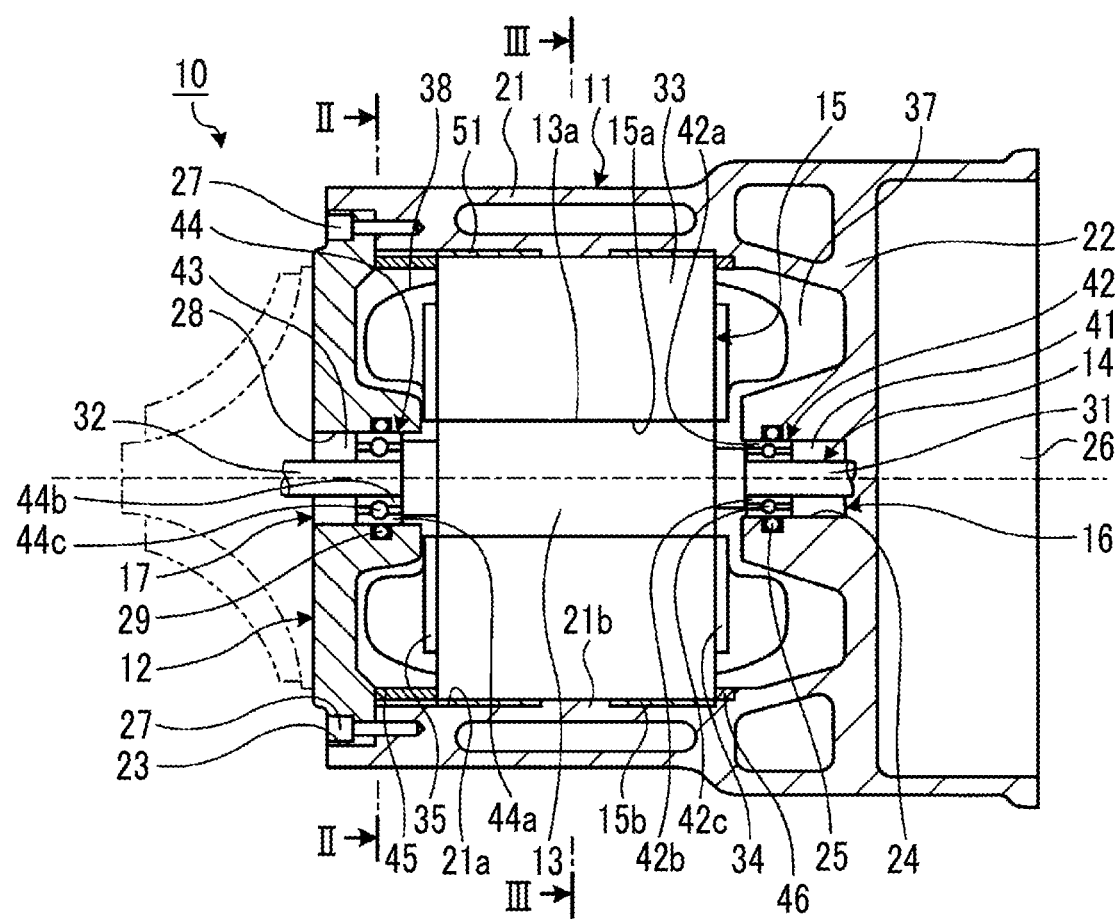
FIG. 1 is a sectional view illustrating an electric motor according to a first embodiment.
Figure 2:
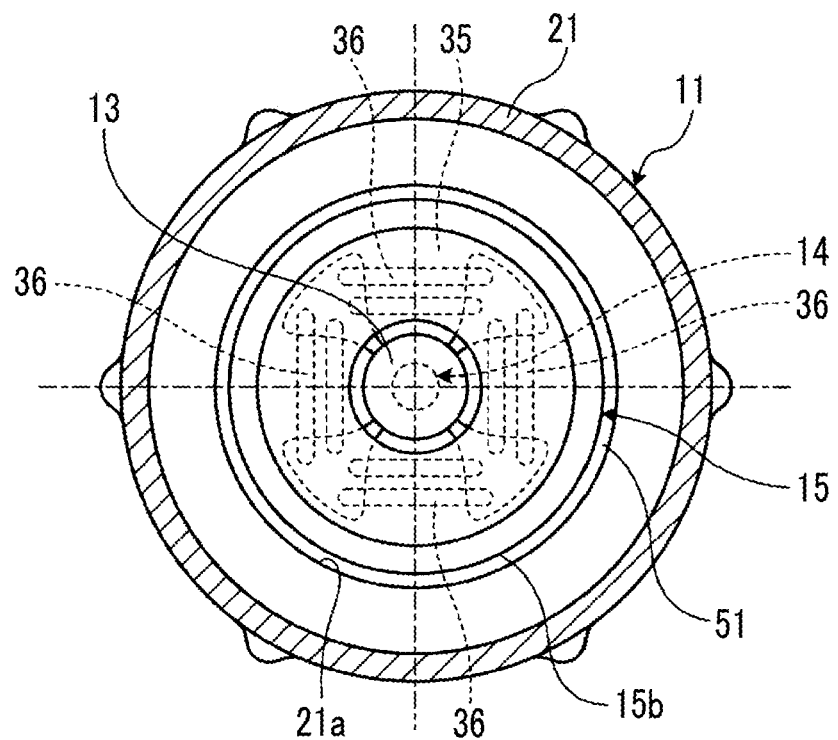
FIG. 2 is a sectional view illustrating an internal structure of the electric motor, which is taken along line II-II in FIG. 1.
Figure 3:
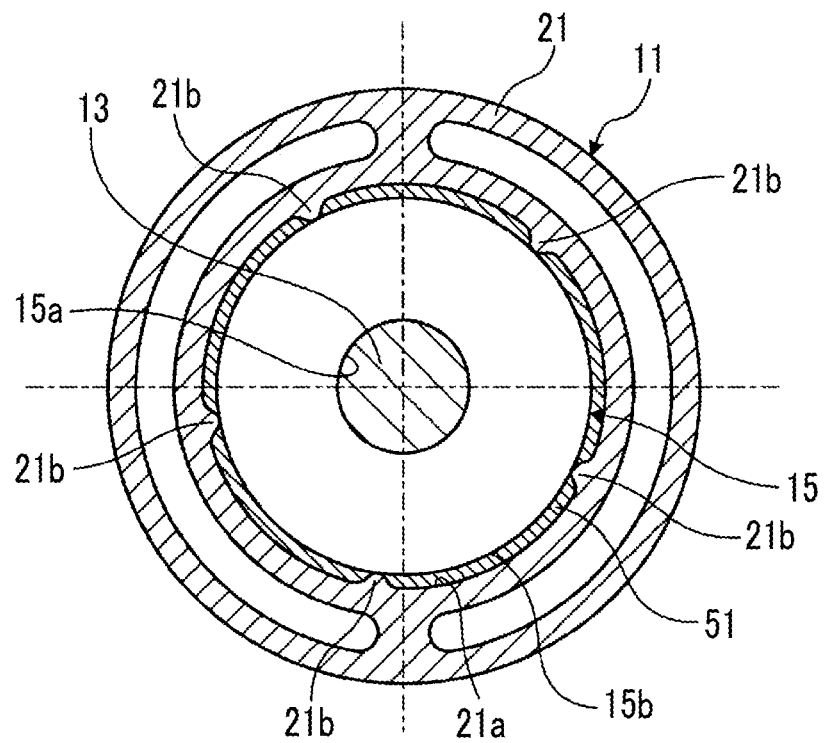
FIG. 3 is a sectional view illustrating the internal structure of the electric motor, which is taken along line III-III in FIG. 1.

FIG. 1 is a sectional view illustrating an electric motor according to a first embodiment. FIG. 2 is a sectional view illustrating an internal structure of the electric motor, which is taken along line II-II in FIG. 1. FIG. 3 is a sectional view illustrating the internal structure of the electric motor, which is taken along line III-III in FIG. 1.

The electric motor according to the first embodiment is applicable to an electric turbocharger. The electric turbocharger drives a compressor by using the electric motor. In this manner, the electric turbocharger suctions external air, and pressurizes the air into compressed air by using an impeller, and supplies the compressed air to an internal combustion engine.

As illustrated in FIGS. 1 to 3, an electric motor 10 includes a stator housing (first housing) 11, a bearing housing (second housing) 12, a rotary shaft 14 having a rotor 13, a stator 15, and a first bearing 16, and a second bearing 17.

The stator housing 11 has a cylindrical hollow shape in which a closing portion 22 is disposed on one side (right side in FIG. 1) in an axial direction in a housing body 21 and an opening 23 is formed on the other side (left side in FIG. 1). The housing body 21 has an inner peripheral surface 21a having the same diameter along the axial direction. The opening 23 is configured to have a stepped portion whose inner diameter is larger than an inner diameter of the inner peripheral surface 21a. The closing portion 22 has a first mounting opening 24 serving as a mounting portion on which the first bearing 16 is mounted, and a damper (the O-ring) 25 is mounted on an inner peripheral surface of the first mounting opening 24. The stator housing 11 has an accommodation portion 26 for accommodating an inverter (not illustrated) on one side in the axial direction, and a compressor (not illustrated) is mounted on the other side.

The bearing housing 12 has a disk shape, is mounted on the opening 23 of the stator housing 11 (housing body 21), and is fixed thereto using a plurality of bolts 27. The bearing housing 12 is set to have a slightly smaller outer diameter than an inner diameter of the opening 23. The bearing housing 12 has a second mounting opening 28 serving as a mounting portion on which the second bearing 17 is mounted, and a damper (the O-ring) 29 is mounted on an inner peripheral surface of the second mounting opening 28. The above-described dampers 25 and 29 are the O-rings. However, as long as the dampers 25 and 29 function as damping members, without being limited to the O-rings having a circular cross section, the dampers 25 and 29 may be damping members having other cross-sectional shapes. Alternatively, the damping members may have a plate shape.

The rotary shaft 14 is configured so that the rotor is fixed to an intermediate portion in the axial direction, and support shafts 31 and 32 are disposed in respective end portions in the axial direction. The rotary shaft 14 (rotor 13) is located in the center portion of the stator housing 11 and the bearing housing along the axial direction. The stator 15 has a ring shape, and is located around the rotor 13 inside the stator housing 11. The stator 15 is configured to include a stator body (stator) 33, a first resin plate (first insulation member) 34, a second resin plate (second insulation member) 35, a coil (winding wire) 36, a first covering portion (mold) 37, and a second covering portion (mold) 38. The stator body 33 has a cylindrical shape, and the first resin plate 34 and the second resin plate 35 which have a ring shape are located in the respective end portions in the axial direction. Then, the coil 36 is wound around the stator body 33, the first resin plate 34, and the second resin plate 35. The first resin plate 34, the second resin plate 35, and the coil 36 are covered by the first covering portion 37 and the second covering portion 38.

The first bearing 16 is mounted on the first mounting opening 24 of the stator housing 11 (closing portion 22), and the second bearing 17 is mounted on the second mounting opening 28 of the bearing housing 12. The first bearing 16 is configured so that a cylindrical sleeve 41 and a rolling bearing 42 are accommodated in series along the axial direction. The rolling bearing 42 is configured so that a plurality of balls 42c are mounted between an outer ring 42a and an inner ring 42b. The first bearing 16 is located in the first mounting opening 24 of the stator housing 11 without any clearance, and the damper 25 is closely fixed to the outer peripheral surface of the rolling bearing 42. The second bearing 17 is configured so that a cylindrical sleeve 43 and a rolling bearing 44 are accommodated in series along the axial direction. The rolling bearing 44 is configured so that a plurality of balls 44c are mounted between an outer ring 44a and an inner ring 44b. The second bearing 17 is located in the second mounting opening 28 of the bearing housing 12 without any clearance, and the damper 29 is closely fixed to the outer peripheral surface of the rolling bearing 44. In addition, in this case, front and rear end portions of the stator 15 in the axial direction are supported by seal rings 45 and 46 mounted on the stator housing 11.

Then, in the rotary shaft 14, the support shaft 31 is inserted into the first bearing 16, and is rotatably supported by the rolling bearing 42. The support shaft 32 is inserted into the second bearing 17, and is rotatably supported by the rolling bearing 44. In this case, the rotary shaft 14 (the rotor 13) and the stator 15 are concentrically arranged. That is, a clearance disposed between an outer peripheral surface 13a of the rotor 13 and an inner peripheral surface 15a of the stator 15 is set to have the same dimension in the circumferential direction. In this manner, a highly accurate coaxial degree is ensured.

In addition, the electric motor 10 has a plurality of (five in the present embodiment) protrusion portions 21b disposed at a predetermined interval in the circumferential direction on an inner peripheral surface 21a of the housing body 21 configuring the stator housing 11. The respective protrusion portions 21b are disposed over a predetermined length in an intermediate portion of the stator 15 in the axial direction, and can come into contact with an outer peripheral surface 15b of the stator 15. In this case, it is desirable that an odd number of the protrusion portions 21b are disposed at an unequal interval in the circumferential direction. Furthermore, the electric motor 10 has a thermal conduction member 51 disposed between the stator housing 11 and the stator 15. That is, a clearance is disposed between the inner peripheral surface 21a of the housing body 21 and the outer peripheral surface 15b of the stator 15 in the stator housing 11, and the clearance is filled with the thermal conduction member 51. This thermal conduction member is a silicon rubber-based filler having high thermal conductivity and elasticity. For example, the thermal conduction member 51 is low hardness heat-dissipating silicone rubber TC Series (Shin-Etsu Chemical Co., Ltd.).

In the above-described electric motor 10, the stator 15 is first inserted into the stator housing 11 through the opening 23. Next, an assembly of the bearing housing 12, the rotary shaft 14, the first bearing 16, and the second bearing 17 are inserted into the stator housing 11, and all of these are assembled together. In this case, in the electric motor 10, the stator housing 11 and the bearing housing 12 need to be assembled to each other so that shaft centers of the rotary shaft 14 (rotor 13) and the stator 15 coincide with each other. Therefore, according to the present embodiment, the electric motor 10 is assembled using a centering jig.

Figure 4:
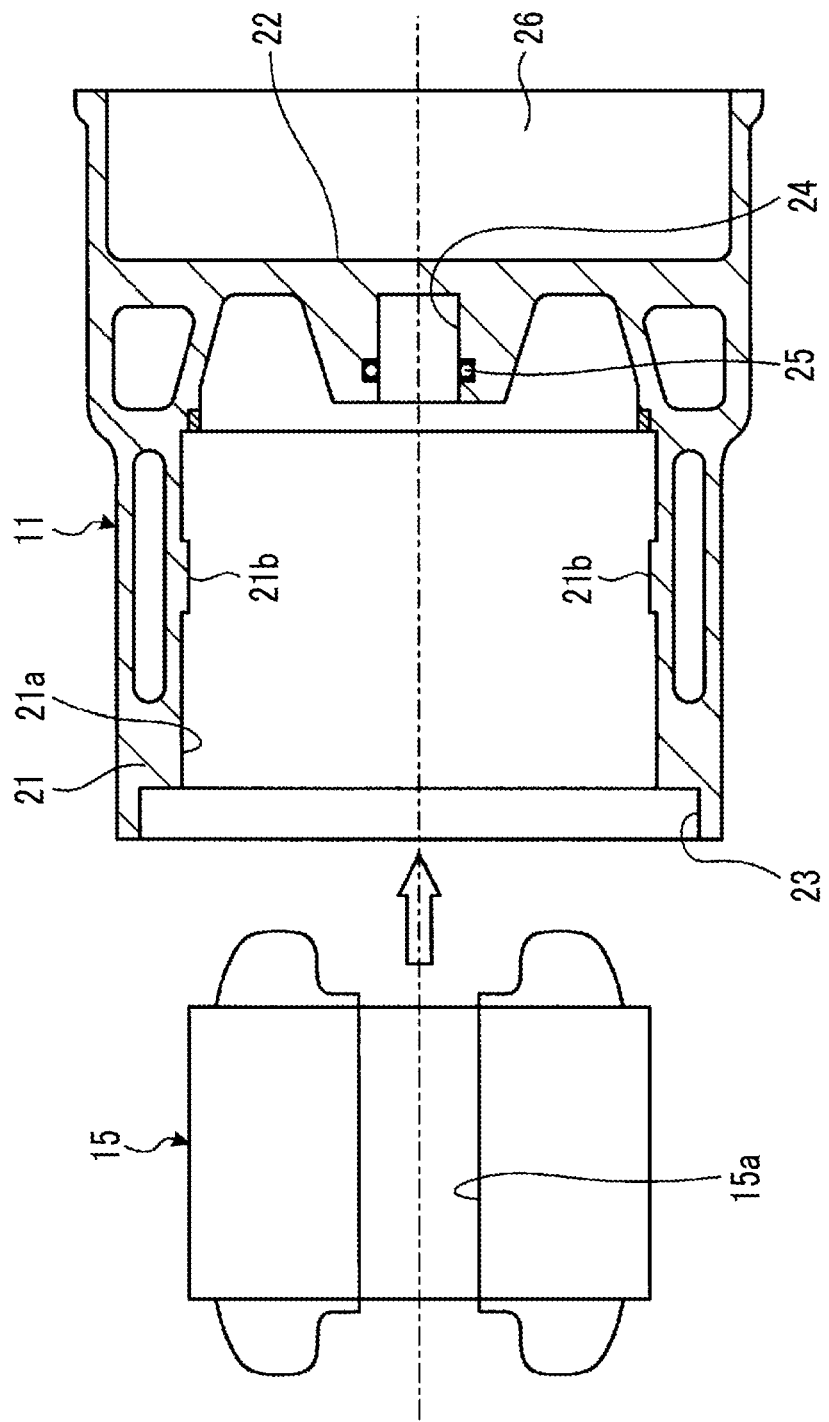
FIG. 4 is a schematic view for describing a step of inserting a stator into a stator housing in a motor assembling method according to the first embodiment.
Figure 5:
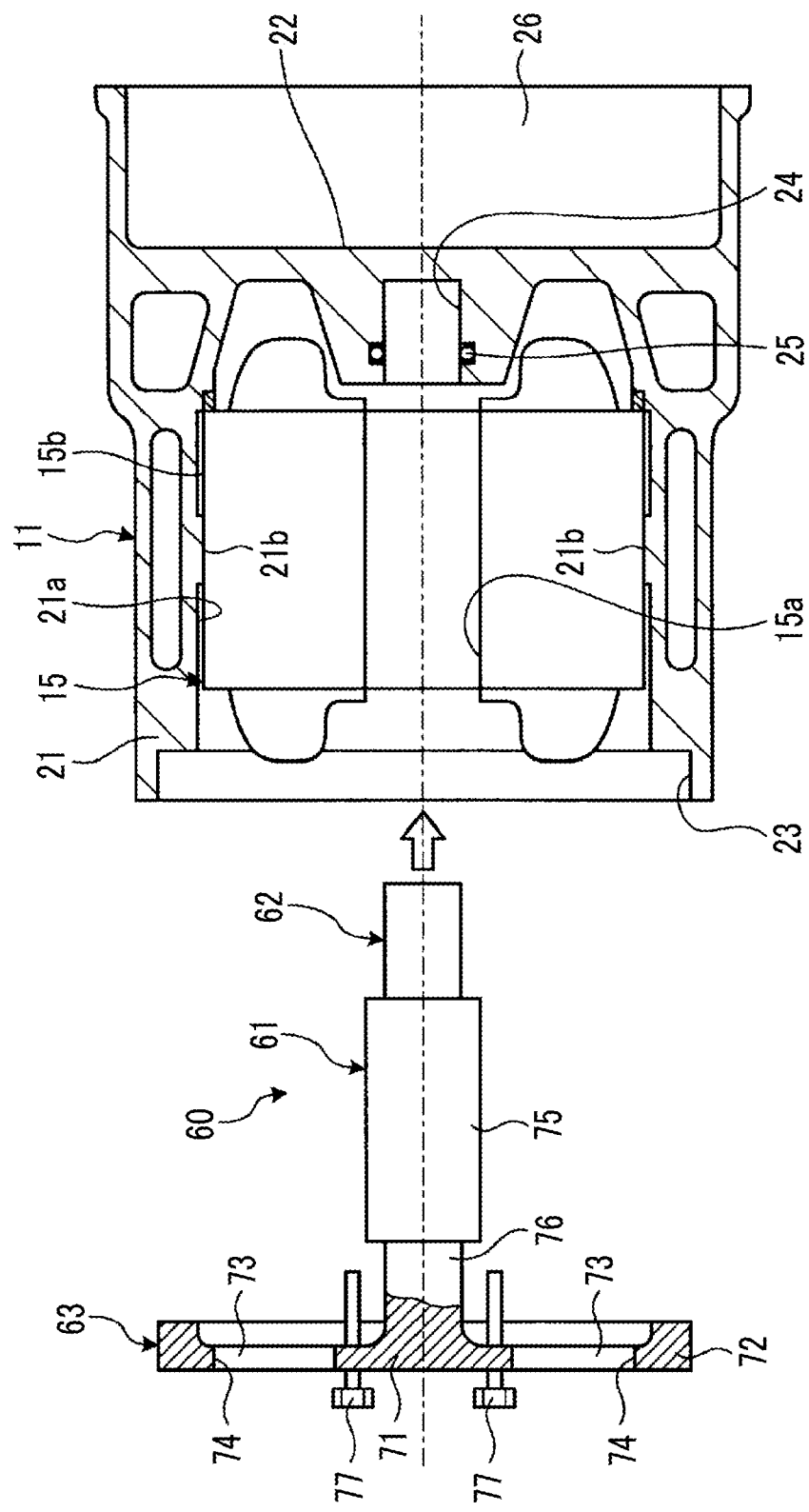
FIG. 5 is a schematic view for describing a step of inserting a centering jig into the stator housing in the motor assembling method.
Figure 6:
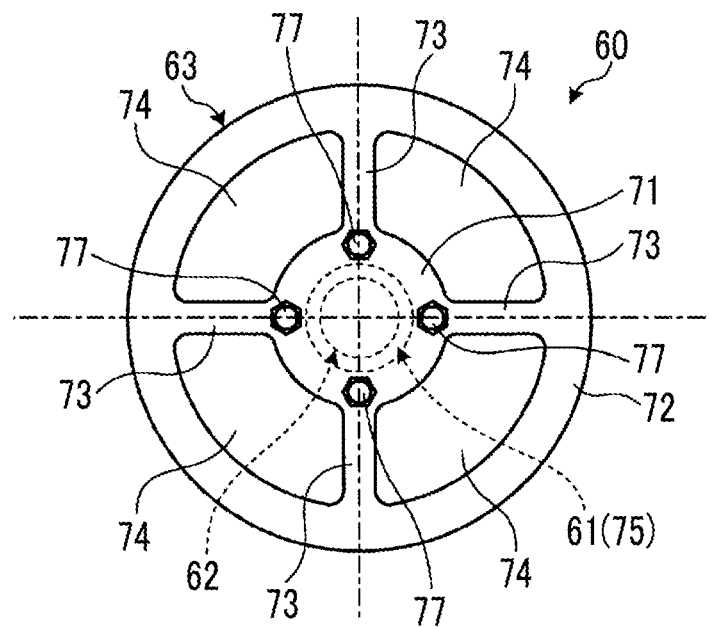
FIG. 6 is a rear view illustrating the centering jig.
Figure 7:
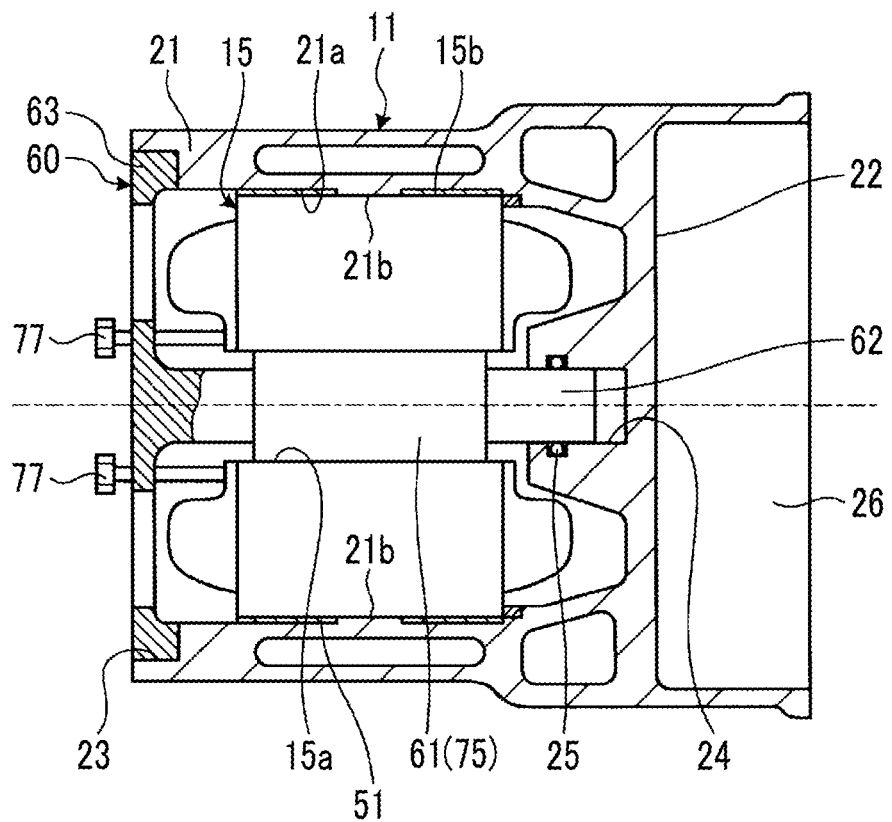
FIG. 7 is a schematic view for describing a stator centering step using the centering jig in the motor assembling method.

FIG. 3 is a sectional view for describing a step of inserting the stator into the stator housing in a motor assembling method according to the first embodiment. FIG. 4 is a schematic view for describing a step of inserting the centering jig into the stator housing. FIG. 5 is a rear view illustrating the centering jig. FIG. 6 is a schematic view for describing a stator centering step using the centering jig. FIG. 7 is a schematic view for describing a step of inserting the rotor and the bearing housing into the stator housing.

As illustrated in FIGS. 4 and 5, a centering jig 60 includes a shaft portion 61, a centering portion 62, and a flange portion 63. The flange portion 63 is configured so that a small-diameter disc portion 71 and a large-diameter ring portion 72 are connected to each other by a plurality of (four in the present embodiment) connection portions 73. The plurality of connection portions 73 connecting the disc portion 71 and the ring portion 72 to each other are arranged at an equal interval in the circumferential direction. In this manner, the flange portion 63 secures a plurality of (four in the present embodiment) work openings 74. In addition, the flange portion 63 is set to have a slightly smaller outer diameter than the inner diameter of the opening 23 of the stator housing 11. The shaft portion 61 is integrally disposed in a flat portion on one side at the center position of the flange portion 63. The shaft portion 61 has a cylindrical positioning shaft 75, and the positioning shaft 75 is set to have the slightly smaller outer diameter than the inner diameter of the stator 15. A base end portion is connected to the center portion of the flange portion 63 via a connection shaft 76. The centering portion 62 has a cylindrical shape, and is connected to the tip portion of the positioning shaft 75. The outer diameter is set to be slightly smaller than the inner diameter of the first mounting opening 24 in the stator housing 11 (closing portion 22). The centering jig 60 has a plurality of (four in the present embodiment) pressing bolts (pressing members) 77 disposed in the disc portion 71 of the flange portion 63. Each of the pressing bolts 77 is screwed from the outside of the flange portion 63, and the tip portion extends to the shaft portion 61 side.

Therefore, in the centering jig 60, the positioning shaft 75 of the shaft portion 61 enters the inner peripheral surface 15a of the stator 15 located in the stator housing 11. The centering portion 62 is located in the first mounting opening 24 of the first bearing 16 without any clearance, and the flange portion 63 can be fitted to the opening 23. Then, each of the pressing bolts 77 is rotated and moved forward so that each tip portion presses the stator 15 located inside the stator housing 11 in the axial direction. In this manner, the stator 15 can be pressed against the stator housing 11.

The motor assembling method according to the first embodiment has a step of inserting the stator 15 into the stator housing 11 through the opening 23, a step of inserting the shaft portion 61 of the centering jig 60 into the inner peripheral surface 15a of the stator 15, fitting the centering portion 62 to the first mounting opening 24 in the stator housing 11, and fitting the flange portion 63 to the opening 23, a step of fixing the stator 15 centered by the centering jig 60 to the stator housing 11, a step of removing the centering jig 60 from the stator housing 11, and a step of inserting the rotary shaft 14, the first bearing 16, and the second bearing 17 into the stator housing 11, and fixing the bearing housing 12 to the opening 23.

Specifically, as illustrated in FIG. 3, the stator housing 11 is fixed using a jig (not illustrated), and the stator 15 is first inserted into the stator housing 11 through the opening 23. In this case, it is desirable to heat the stator housing 11 in advance and to enlarge the inner diameter of the inner peripheral surface 21a (protrusion portion 21b) of the housing body 21. Then, as illustrated in FIG. 4, the outer peripheral surface 15b of the stator 15 is located inside the stator housing 11 with a predetermined clearance from the inner peripheral surface 21a of the housing body 21. Next, the centering jig 60 is inserted into the stator housing 11, and the stator 15 is positioned. That is, as illustrated in FIGS. 5 and 6, in the centering jig 60, the positioning shaft 75 of the shaft portion 61 is inserted into the inner peripheral surface 15a of the stator 15, and the centering portion 62 is located in the first mounting opening 24 of the housing body 21 without any clearance. In addition, the flange portion 63 of the centering jig 60 is located in the opening 23 of the housing body 21 without any clearance.

Therefore, the centering portion 62 of the centering jig 60 is located in the first mounting opening 24 without any clearance, and the flange portion 63 is fitted to the opening 23. In this manner, the centering jig 60 is positioned at two locations in the stator housing 11. In this case, in the centering jig 60 positioned in the stator housing 11, the positioning shaft 75 of the shaft portion 61 is inserted into the inner peripheral surface 15a of the stator 15. Accordingly, the stator 15 is positioned in the stator housing 11 via the centering jig 60. In addition, the plurality of pressing bolts 77 are rotated and moved forward so that the tip portion is pressed against the stator 15. In this manner, the stator is pressed against the stator housing 11, and is temporarily fixed to the stator housing 11.

Then, the stator 15 centered by the centering jig 60 and temporarily fixed by the plurality of pressing bolts 77 is fixed to the stator housing 11. That is, a tool is inserted into the stator housing 11 through the work opening 74 of the centering jig 60, and the clearance between the outer peripheral surface 15b of the stator 15 and the inner peripheral surface 21a of the housing body 21 is filled with the thermal conduction member 51. Then, if the thermal conduction member 51 is solidified, the stator 15 is fixed to be immovable in the radial direction and the axial direction inside the stator housing 11. In this case, the stator housing 11 is heated in advance, and the inner diameter of the inner peripheral surface 21a (protrusion portion 21b) of the housing body 21 is enlarged. Accordingly, it is desirable that the stator housing 11 is cooled to room temperature before the stator 15 is fixed to the stator housing 11. When the stator 15 is fixed inside the stator housing 11, some of the plurality of protrusion portions 21b disposed at an unequal interval in the circumferential direction on the inner peripheral surface 21a come into contact with the outer peripheral surface 15b of the stator 15.

Thereafter, the centering jig 60 is removed from the stator housing 11 as illustrated in FIG. 7. Then, the rotary shaft 14, the first bearing 16, the second bearing 17, and the bearing housing 12 are inserted into and fixed to the stator housing 11 through the opening 23. In this case, the first bearing 16 and the second bearing 17 are mounted on the respective support shafts 31 and 32 of the rotary shaft 14, and the bearing housing 12 is mounted on the second bearing 17, thereby configuring an assembly. The assembly is inserted into and fixed to the stator housing 11 through the opening 23. That is, the first bearing 16 is located in the first mounting opening 24 of the stator housing 11 without any clearance, the rotor 13 of the rotary shaft 14 is located inside the stator 15. The bearing housing 12 is located in the opening 23 without any clearance. The bearing housing 12 is fixed to the stator housing 11 by the plurality of bolts 27 as illustrated in FIG. 1.

As described above, the motor assembling method according to the first embodiment has a step of inserting the stator 15 into the stator housing 11 through the opening 23, a step of inserting the shaft portion 61 of the centering jig 60 into the inner peripheral surface 15a of the stator 15, fitting the centering portion 62 to the first mounting opening 24 in the stator housing 11, and fitting the flange portion 63 to the opening 23 and inserting the centering portion 62, a step of fixing the stator 15 centered by the centering jig 60 to the stator housing 11, a step of removing the centering jig 60 from the stator housing 11, and a step of inserting the rotary shaft 14, the first bearing 16, and the second bearing 17 into the stator housing 11, and fixing the bearing housing 12 to the opening 23.

Therefore, in the centering jig 60, the centering portion 62 is fitted to the first mounting opening 24 of the stator housing 11, and the flange portion 63 is fitted to the opening 23. In this manner, the centering jig 60 is positioned in two locations for the stator housing 11. The shaft portion 61 is fitted to the inner peripheral surface 15a of the stator 15. In this manner, the stator 15 is positioned in the centering jig 60. Therefore, the stator 15 is positioned in the stator housing 11 via the centering jig 60. Then, the stator 15 is fixed to the stator housing 11 in a positioned state. Thereafter, the centering jig 60 is removed from the stator housing 11, and the rotary shaft 14 is located inside the stator housing 11 so that the rotor 13 is inserted into the inner peripheral surface 15a of the stator 15. In this manner, the rotary shaft 14 is positioned for the inner peripheral surface 15a of the stator 15 via the rotor 13. As a result, the rotor 13 and the stator 15 of the rotary shaft 14 are concentrically arranged. A highly accurate coaxial degree between the rotor 13 and the stator 15 is ensured by improving assembling accuracy. Accordingly, it is possible to assemble the electric motor 10 which prevents noise generation when the electric motor 10 is driven.

In the motor assembling method according to the first embodiment, the centering jig 60 is inserted into the stator housing 11. Thereafter, the stator 15 is pressed against the stator housing 11 in the axial direction by the plurality of pressing bolts 77. In this state, the stator 15 is fixed to the stator housing 11. Therefore, the stator 15 inside the stator housing 11 is pressed against the stator housing 11 by the respective pressing bolts 77. Accordingly, the stator 15 can be highly accurately fixed to the stator housing 11 without causing any misalignment.

In the motor assembling method according to the first embodiment, the centering jig 60 is inserted into the stator housing 11. Thereafter, the clearance between the outer peripheral surface 15b of the stator 15 and the inner peripheral surface 21a of the stator housing 11 is filled with the thermal conduction member 51. In this manner, the stator 15 is fixed to the stator housing 11. Therefore, in a state where the stator 15 inside the stator housing 11 is positioned by the centering jig 60, the clearance between the outer peripheral surface 15b of the stator 15 and the inner peripheral surface 21a of the stator housing 11 is filled with the thermal conduction member 51. In this manner, the thermal conduction member can prevent misalignment of the stator 15 highly accurately positioned in the stator housing 11 by using the centering jig 60.

In addition, the centering jig according to the first embodiment includes the shaft portion 61 fitted to the inner peripheral surface 15a of the stator 15 inserted into the stator housing 11, the centering portion 62 disposed in the tip portion in the shaft portion 61 and fitted to the first mounting opening 24 in the stator housing 11, and the flange portion 63 fitted to the opening 23.

Therefore, the centering portion 62 is fitted to the first mounting opening 24 of the stator housing 11, and the flange portion 63 is fitted to the opening 23. In this manner, the centering jig 60 is positioned in two locations for the stator housing 11, and the shaft portion is fitted to the inner peripheral surface 15a of the stator 15. Accordingly, the stator 15 is positioned in the centering jig 60. Therefore, the stator 15 is positioned in the stator housing 11 via the centering jig 60. Thereafter, the centering jig 60 is removed from the stator housing 11, and the rotary shaft 14 is located inside the stator housing 11 so that the rotor 13 is inserted into the inner peripheral surface 15a of the stator 15. In this manner, the rotary shaft 14 is positioned for the inner peripheral surface 15a of the stator 15 through the rotor 13. As a result, the rotor 13 and the stator 15 of the rotary shaft 14 are concentrically arranged. A highly accurate coaxial degree between the rotor 13 and the stator 15 is ensured by improving assembling accuracy. Accordingly, it is possible to easily and highly accurately assemble the electric motor 10 which prevents noise generation when the electric motor 10 is driven.

The centering jig according to the first embodiment has the pressing bolt 77 that can press the stator 15 against the stator housing 11 in the axial direction. Therefore, the stator 15 inserted into the stator housing is pressed against the stator housing 11 by the pressing bolt 77. In this state, the stator 15 can be highly accurately and easily fixed to the stator housing 11.

In addition, the electric motor according to the first embodiment includes the stator housing 11 having the opening 23 disposed on one side in the axial direction, the rotary shaft 14 having the rotor 13 and located along the axial direction in the center portion inside the stator housing 11, the stator 15 located around the rotor inside the stator housing 11, the bearing housing 12 fixed to the opening 23, the first bearing 16 and the second bearing 17 which are disposed in the stator housing 11 and the bearing housing 12 and rotatably supporting the support shafts 31 and 32 of the rotary shaft 14, and the thermal conduction member 51 located in the clearance between the outer peripheral surface 15b of the stator 15 and the inner peripheral surface 21a of the stator housing 11.

Therefore, the thermal conduction member 51 is located in the clearance between the outer peripheral surface 15b of the stator 15 and the inner peripheral surface 21a of the stator housing 11. In this manner, the stator 15 is closely fixed to the stator housing 11. The vibration of the stator 15 can be prevented. Accordingly, noise generation can be prevented by improving the assembling accuracy and ensuring the highly accurate coaxial degree between the rotor 13 and the stator 15. In addition, heat generated in the stator 15 is transferred and dissipated to the stator housing 11 via the thermal conduction member 51. Therefore, cooling performance of the stator 15 can be improved.

In the electric motor according to the first embodiment, the plurality of protrusion portions 21b which partially come into contact with the outer peripheral surface 15b of the stator 15, are disposed at a predetermined interval in the circumferential direction apart on the inner peripheral surface 21a of the stator housing 11. Therefore, some of the plurality of protrusion portions 21b disposed on the inner peripheral surface 21a of the stator housing 11 come into contact with the outer peripheral surface 15b of the stator 15. In this manner, it is possible to prevent resonance occurrence between the stator housing 11 and the stator 15. In this case, an odd number of the protrusion portions 21b are disposed at an unequal interval in the circumferential direction of the stator housing 11. In this manner, it is possible to prevent resonance occurrence in a secondary mode (secondary natural frequency) or fourth mode (fourth natural frequency) of vibration. In this case, the plurality the protrusion portions which partially come into contact with the inner peripheral surface 21a of the stator housing 11 may be disposed at a predetermined interval in the circumferential direction on the outer peripheral surface 15b of the stator 15.

Second Embodiment

Figure 8:
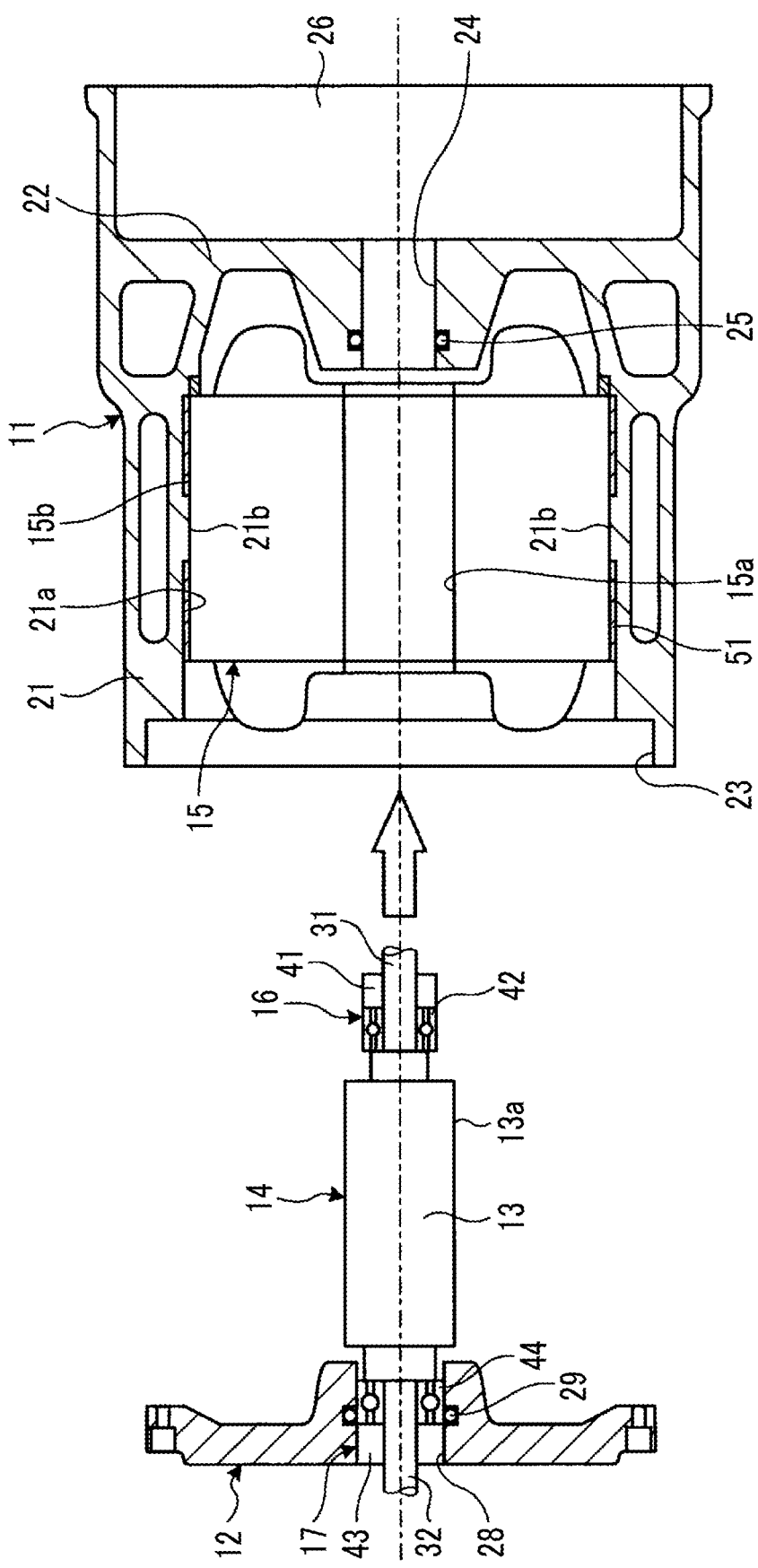
FIG. 8 is a schematic view for describing a step of inserting a rotor and a bearing housing into the stator housing in the motor assembling method.
Figure 9:
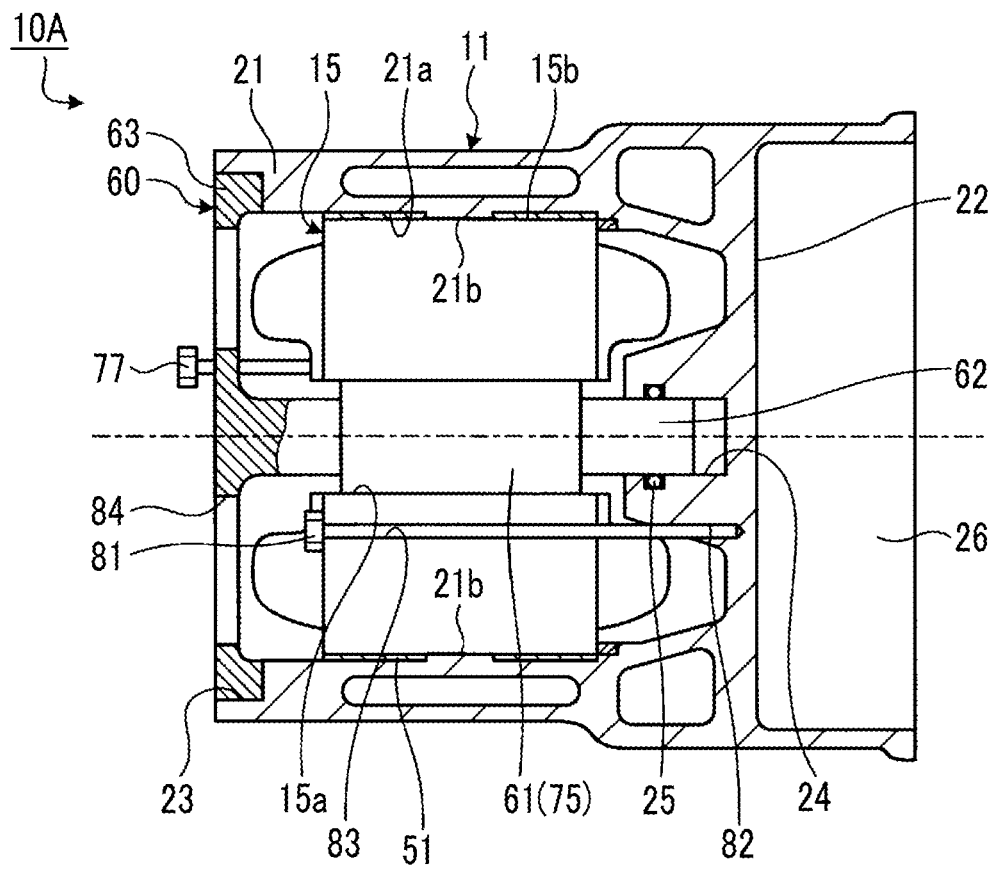
FIG. 9 is a schematic view for describing a stator fixing step using a bolt in a motor assembling method according to a second embodiment.

FIG. 8 is a schematic view for describing a step of fixing the stator by using a bolt in a motor assembling method according to a second embodiment, and FIG. 9 is a rear view illustrating a centering jig according to the second embodiment. A basic configuration of the present embodiment is the same as that of the first embodiment described above. The same reference numerals will be given to members having the same functions as those of the first embodiment described with reference to FIG. 1. Detailed description thereof will be omitted.

As illustrated in FIGS. 1 and 8, an electric motor 10A includes the stator housing 11, the bearing housing 12, the rotary shaft 14 having the rotor 13, the stator 15, the first bearing 16, and the Second bearing 17.

The stator housing 11 is configured to include the housing body 21 and the closing portion 22, and has the opening 23. The first mounting opening 24 is formed in the closing portion 22. The bearing housing 12 is mounted on the opening 23 of the stator housing 11, and is fixed using a plurality of bolts 27. The bearing housing 12 has the second mounting opening 28.

The rotary shaft 14 is configured so that the rotor is fixed to an intermediate portion in the axial direction, and support shafts 31 and 32 are disposed in respective end portions in the axial direction. The rotary shaft 14 (rotor 13) is located in the center portion of the stator housing 11 and the bearing housing along the axial direction. The stator 15 is located around the rotor 13 inside the stator housing 11. The first bearing 16 is mounted on the first mounting opening 24 of the stator housing 11 (closing portion 22), and the second bearing 17 is mounted on the second mounting opening 28 of the bearing housing 12. In the rotary shaft 14, the support shaft 31 is rotatably supported by the first bearing 16, and the support shaft 32 is rotatably supported by the second bearing 17.

In addition, the electric motor 10A has the thermal conduction member 51 disposed between the stator housing and the stator 15. That is, a clearance is disposed between the inner peripheral surface 21a of the housing body 21 and the outer peripheral surface 15b of the stator 15 in the stator housing 11, and the clearance is filled with the thermal conduction member 51. Furthermore, as illustrated in FIGS. 8 and 9, in the electric motor 10A, the stator 15 is fixed to the stator housing 11 by using a plurality of (two in the present embodiment) fastening bolts 81. That is, the stator housing 11 has a plurality of (two in the present embodiment) female screw portions formed around the first mounting opening 24 in the closing portion 22. The stator 15 has a plurality of (two in the present embodiment) through-holes 83 formed along the axial direction. The through-hole 83 is formed close to a center side in the radial direction of the stator 15, and the inner diameter is formed to be larger than the outer diameter of the fastening bolt 81. The through-hole 83 may be formed close to the outer peripheral portion side in the radial direction of the stator 15.

The centering jig 60 includes the shaft portion 61, the centering portion 62, and the flange portion 63. The centering jig 60 has a plurality of (four in the present embodiment) pressing bolts (pressing members) 77 disposed in the disc portion 71 of the flange portion 63. In addition, the centering jig 60 has a plurality of (two in the present embodiment) cutout portions 84 formed in the disc portion 71.

A motor assembling method according to the second embodiment has a step of inserting the stator 15 into the stator housing 11 through the opening 23, a step of inserting the shaft portion 61 of the centering jig 60 into the inner peripheral surface 15a of the stator 15, fitting the centering portion 62 to the first mounting opening 24 in the stator housing 11, and fitting the flange portion 63 to the opening 23, a step of fixing the stator 15 centered by the centering jig 60 to the stator housing 11, a step for removing the centering jig 60 from the stator housing 11, and a step of inserting the rotary shaft 14, the first bearing 16, and the second bearing 17 into the stator housing 11, and fixing the bearing housing 12 to the opening 23.

Specifically, the stator 15 is first inserted into the stator housing 11 through the opening 23. In this case, the stator 15 is located so that the respective through-holes 83 of the stator 15 and the respective female screw portions 82 of the stator housing 11 are located at the same position in the circumferential direction. Next, the centering jig 60 is inserted into the stator housing 11, and the stator 15 is positioned. In this case, the centering jig 60 is located so that the respective cutout portions 84 of the centering jig 60 and the respective through-holes 83 of the stator 15 are located at the same position in the circumferential direction.

Therefore, the centering portion 62 of the centering jig 60 is located in the first mounting opening 24 without any clearance, and the flange portion 63 is fitted to the opening 23. In this manner, the centering jig 60 is positioned at two locations in the stator housing 11. In this case, in the centering jig 60 positioned in the stator housing 11, the positioning shaft 75 of the shaft portion 61 is inserted into the inner peripheral surface 15a of the stator 15. Accordingly, the stator 15 is positioned in the stator housing 11 via the centering jig 60. In addition, the plurality of pressing bolts 77 are rotated and moved forward so that the tip portion is pressed against the stator 15. In this manner, the stator is pressed against the stator housing 11, and is temporarily fixed to the stator housing 11.

Then, the stator 15 centered by the centering jig 60 and temporarily fixed by the plurality of pressing bolts is fixed to the stator housing 11. That is, the fastening bolt 81 is inserted into the through-hole 83 of the stator 15 through the work opening 74 of the centering jig 60. The fastening bolt 81 is rotated using a fastening tool, and is screwed into the respective female screw portions 82 of the stator housing 11. In addition, a tool is inserted into the stator housing 11. The clearance between the outer peripheral surface 15b of the stator 15 and the inner peripheral surface 21a of the housing body 21 is filled with the thermal conduction member 51, and is solidified. Then, the stator 15 is fixed by the fastening bolt 81 and the thermal conduction member 51 so as to be immovable in the radial direction and the axial direction inside the stator housing 11.

Thereafter, as illustrated in FIG. 7, the centering jig 60 is removed from the stator housing 11. The rotary shaft 14, the first bearing 16, and the second bearing 17, and the bearing housing 12 are inserted into and fixed to the stator housing 11 through the opening 23.

In this way, in the motor assembling method according to the second embodiment, the centering jig 60 is inserted into the stator housing 11. Thereafter, the stator 15 is fixed to the stator housing 11 by using the plurality of fastening bolts 81.

Therefore, in a state where the stator 15 inside the stator housing 11 is positioned using the centering jig 60, and the stator 15 is fixed to the stator housing 11 by using the plurality of fastening bolts 81. In this manner, the stator 15 can be firmly fixed to the stator housing 11.

In the second embodiment, the stator 15 is fixed inside the stator housing 11 by using the fastening bolt and the thermal conduction member 51. However, the thermal conduction member 51 may be omitted by increasing the number of the fastening bolts 81.

Third Embodiment

Figure 10:
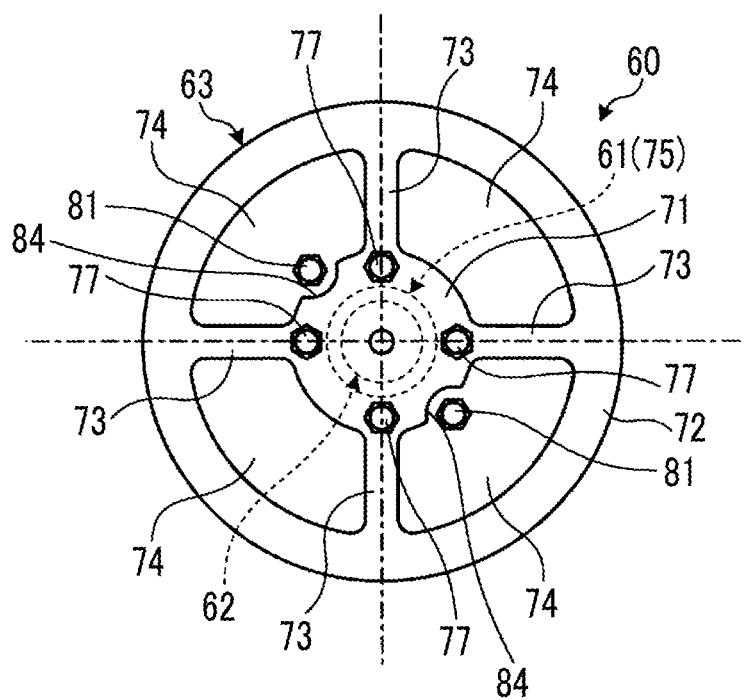
FIG. 10 is a rear view illustrating a centering jig according to the second embodiment.
Figure 11:
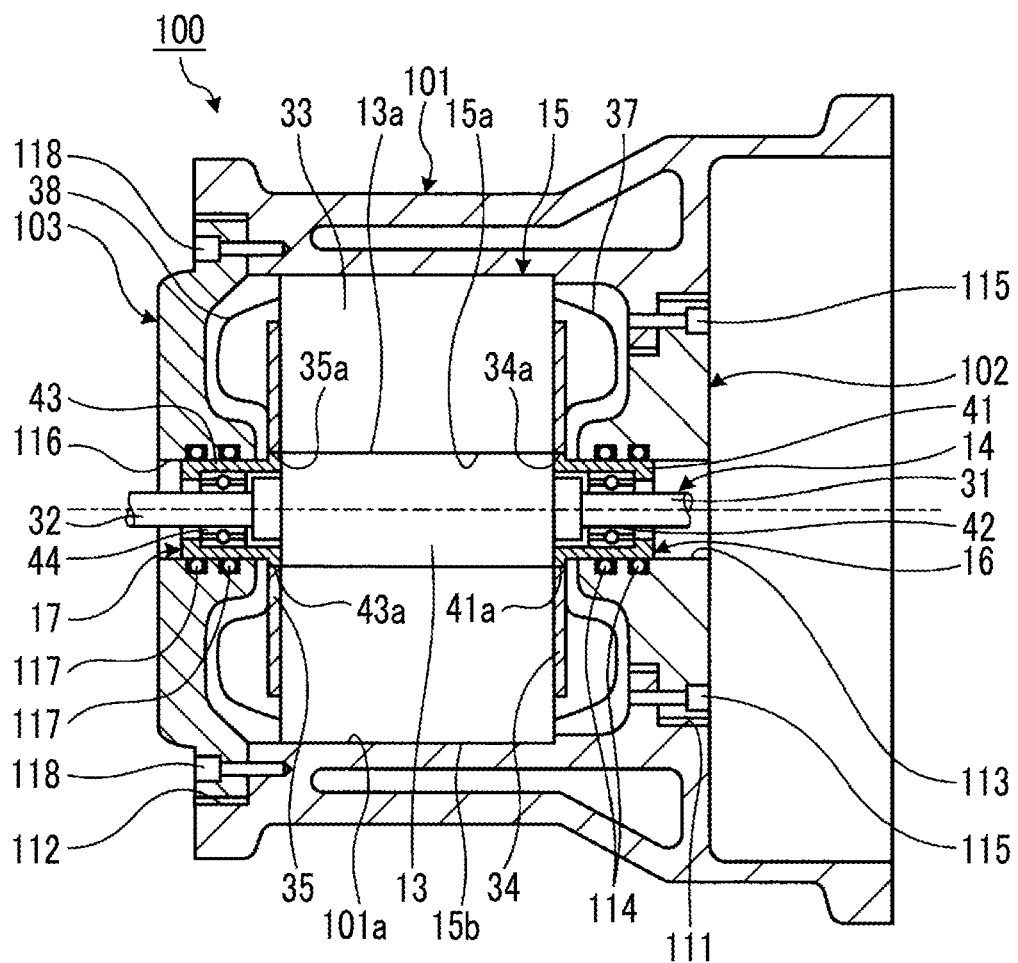
FIG. 11 is a sectional view illustrating an electric motor according to a third embodiment.

FIG. 10 is a sectional view illustrating an electric motor according to a third embodiment, and FIG. 11 is an enlarged view illustrating a main portion of a centering structure of the rotor. The same reference numerals will be given to members having the same functions as those of the above-described embodiments. Detailed description thereof will be omitted.

As illustrated in FIGS. 10 and 11, an electric motor 100 includes a stator housing (first housing) 101, a first bearing housing (second housing) 102, a second bearing housing (second housing) 103, the rotary shaft 14 having the rotor 13, the stator 15, the first bearing 16, and the second bearing 17.

The stator housing 101 has a cylindrical shape. An opening 111 is formed on one side (right side in FIG. 10) in the axial direction, and an opening 112 is formed on the other side (left side in FIG. 10) in the axial direction. The first bearing housing 102 has a disc shape, and has a first mounting opening 113 formed as the mounting portion, on the center position of which the first bearing 16 is mounted. A damper (O-ring) 114 is mounted on the inner peripheral surface of the first mounting opening 113. The first bearing housing 102 is mounted on the opening 111 of the stator housing 101, and is fixed thereto using a plurality of bolts 115. The first bearing housing 102 has a slightly smaller outer diameter than an inner diameter of the opening 111. The second bearing housing 103 has a disc shape, and has a second mounting opening 116 formed as the mounting portion, on the center position of which the second bearing 17 is mounted. A damper (O-ring) 117 is mounted on the inner peripheral surface of the second mounting opening 116. The second bearing housing 103 is mounted on the opening 112 of the stator housing 101, and is fixed thereto using a plurality of bolts 118. The second bearing housing 103 has a slightly smaller outer diameter than an inner diameter of the opening 112.

The rotary shaft 14 is configured so that the rotor is fixed to an intermediate portion in the axial direction, and support shafts 31 and 32 are disposed in respective end portions in the axial direction. The rotary shaft 14 (rotor 13) is located in the center portion of the stator housing 101 along the axial direction. The stator 15 has a ring shape, and is arranged around the rotor 13 inside the stator housing 101. In this case, the outer peripheral portion of the stator 15 is press-fitted into and fixed to the inner peripheral portion of the stator housing 101.

The first bearing 16 is mounted on the first mounting opening 113 of the first bearing housing 102, and the second bearing 17 is mounted on the second mounting opening 116 of the second bearing housing 103. In this case, the stator 15 is set so that the inner diameter of the first resin plate 34 and the second resin plate 35 is smaller than the inner diameter of the stator body 33. After the stator 15 is fixed inside the stator housing 101, the inner peripheral surfaces 34a and 35a of the first resin plate 34 and the second resin plate 35 are subjected to finishing. In this manner, the center of the stator 15 and the center of the stator housing 101 coincide with each other. On the other hand, in the first bearing 16 mounted on the first bearing housing 102 and the second bearing 17 mounted on the second bearing housing 103, one end portion of the respective sleeves 41 and 43 extends to the rotor 13 side. Outer peripheral protrusion surfaces 41a and 43b are respectively formed therein. The respective outer peripheral protrusion surfaces 41a and 43b are set to have the outer diameter slightly larger than the outer diameter of the respective bearings 16 and (sleeves 41 and 43). The outer peripheral protrusion surface 41a of the first bearing 16 is fitted to the inner peripheral surface 34a of the first resin plate 34, and the outer peripheral protrusion surface 43a of the second bearing 17 is fitted to the inner peripheral surface 35a of the second resin plate 35.

Then, in the rotary shaft 14, the support shaft 31 is rotatably supported by the first bearing 16, and the support shaft 32 is rotatably supported by the second bearing 17. Therefore, the rotary shaft 14 (rotor 13) is located concentrically with the stator 15.

A motor assembling method according to the third embodiment has a step of inserting and fixing the stator 15 into the stator housing 101 through the opening 112, a step of finishing the inner peripheral surfaces 34a and 35a of first resin plate 34 and the second resin plate 35 of the stator 15 located inside the stator housing 101, a step of inserting the rotary shaft 14, the first bearing 16, and the second bearing 17 into the stator housing 101, and fitting the respective outer peripheral protrusion surfaces 41a and 43b of the first bearing 16 and the second bearing 17 to the inner peripheral surfaces 34a and 35a of the first resin plate 34 and the second resin plate 35, and a step of fixing the first bearing housing 102 to the opening 111, and fixing the second bearing housing 103 to the opening 112.

Specifically, the stator housing 101 is fixed using a jig (not illustrated), and the stator 15 is first fixed to and mounted on the inner peripheral surface 101a of the stator housing 101 through the opening 112. Here, the first resin plate 34 of the stator 15 fixed inside the stator housing 101 and the inner peripheral surfaces 34a and 35a of the second resin plate 35 are subjected to finishing by a cutting device. In this manner, the inner peripheral surfaces 34a and 35a of the respective resin plates 34 and 35 secure roundness, and the center of the stator housing 101 and the center of the stator 15 coincide with each other. Next, the rotary shaft 14, the first bearing 16, the second bearing 17, and the second bearing housing 103 are inserted into and fixed to the stator housing 101 through the opening 112. In this case, the first bearing 16 and the second bearing 17 and the second bearing 17 are mounted on the respective support shafts 31 and 32 of the rotary shaft 14. The second bearing housing 103 is mounted on the second bearing 17 so as to form an assembly. The assembly is inserted into and fixed to the stator housing 101 through the opening 112.

That is, the rotor 13 of the rotary shaft 14 is located inside the stator 15. The outer peripheral protrusion surface 41a of the first bearing 16 is fitted to the inner peripheral surface 34a of the first resin plate 34. The outer peripheral protrusion surface 43b of the second bearing 17 is fitted to the inner peripheral surface 35a of the second resin plate 35. Therefore, the center of the stator 15 and the center of the rotor 13 of the rotary shaft 14 coincide with each other. Then, the second bearing housing 103 mounted on the opening 112 is fixed using the plurality of bolts 118. In addition, the first bearing housing 102 is mounted on the opening 111 so that the first bearing housing 102 is mounted on the first bearing 16, and is fixed thereto using the plurality of bolts 115. In this case, mounting holes formed in the respective bearing housings 102 and 130, through which the bolts 115 and 118 penetrate, are set to have the inner diameter larger than the outer diameter of the bolts 115 and 118, and the positions of the respective bearing housings 102 and 130 are not misaligned due to the fastening of the bolts 115 and 118.

In this way, in the motor assembling method according to the third embodiment, when the rotary shaft 14, the first bearing 16, and the second bearing 17 are inserted into the stator housing 101, the outer peripheral protrusion surfaces 41a and 43a of the first bearing 16 and the second bearing 17 are fitted to the inner peripheral surfaces 34a and 35a of the first resin plate and the second resin plate 35. In this manner, centering is performed on the rotor 13.

Therefore, the respective outer peripheral protrusion surfaces 41a and 43a of the first bearing 16 and the second bearing 17 are fitted to the respective inner peripheral surfaces 34a and 35a of the first resin plate 34 and the second resin plate 35. In this manner, the centering is performed on the rotor 13. Accordingly, a simple configuration can ensure a highly accurate coaxial degree between the rotor 13 and the stator 15.

In the motor assembling method according to the third embodiment, the stator 15 is inserted into the stator housing 101. Thereafter, the respective inner peripheral surfaces 34a and 35a of the first resin plate and the second resin plate 35 are subjected to finishing. The rotary shaft 14, the first bearing 16, and the second bearing 17 are inserted into the stator housing 101. Therefore, the outer peripheral protrusion surfaces 41a and 43a of the first bearing 16 and the second bearing 17 are fitted to the respective inner peripheral surfaces 34a and 35a of the first resin plate 34 and the second resin plate 35 which are subjected to the finishing. The rotor 13 and the stator 15 are concentrically arranged. A highly accurate coaxial degree between the rotor 13 and the stator 15 is ensured by improving assembling accuracy.

In the electric motor according to the third embodiment, the first resin plate 34 and the second resin plate 35 which have a ring shape are fixed to respective end portions of the stator body 33 in the axial direction. The stator body 33, the first resin plate 34, and the second resin plate 35 are wound around the coil 36 (refer to FIG. 2) so as to configure the stator 15. The outer peripheral protrusion surface 41a of the first bearing 16 is fitted to the inner peripheral surface 34a of the first resin plate 34. The outer peripheral protrusion surface 43a of the second bearing 17 is fitted to the inner peripheral surface 35a of the second resin plate 35.

Therefore, the outer peripheral protrusion surface 41a of the first bearing 16 is fitted to the inner peripheral surface 34a of the first resin plate 34. The outer peripheral protrusion surface 43a of the second bearing 17 is fitted to the inner peripheral surface 35a of the second resin plate 35. In this manner, the shaft centers of the rotor 13 and the stator 15 can coincide with each other by ensuring high accuracy in processing the outer peripheral protrusion surfaces 41a and 43a of the respective bearings 16 and 17 or the inner peripheral surfaces 34a and 35a of the respective resin plates 34 and 35. Therefore, the assembling accuracy can be improved.

Fourth Embodiment

Figure 12:
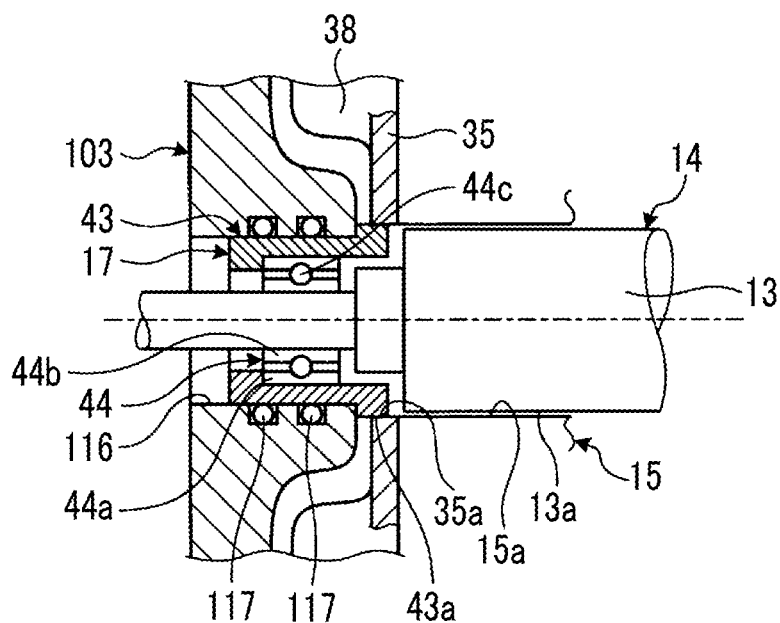
FIG. 12 is an enlarged view illustrating a main portion of a centering structure of a rotor.
Figure 13:
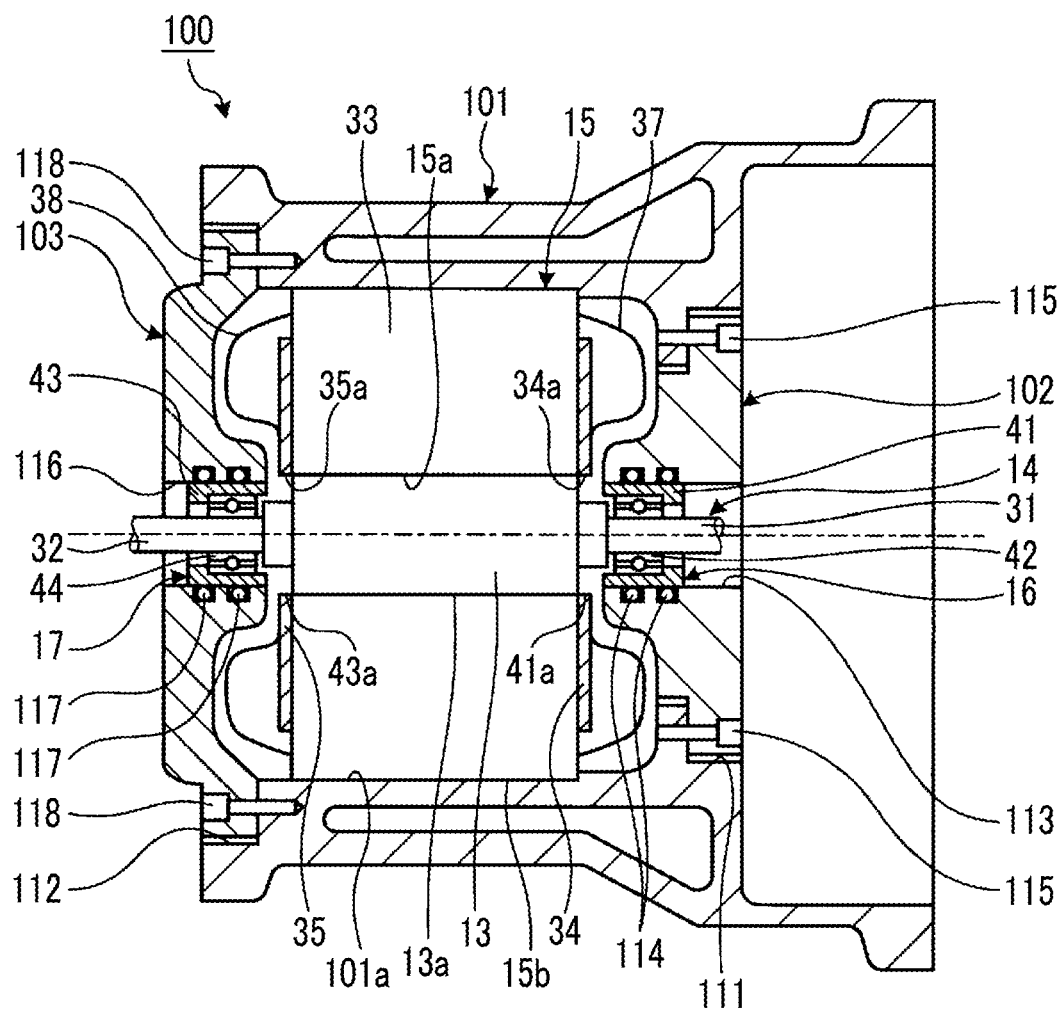
FIG. 13 is a sectional view illustrating an electric motor according to a fourth embodiment.

FIG. 12 is a sectional view illustrating an electric motor according to a fourth embodiment. The same reference numerals will be given to members having the same functions as those of the above-described embodiments. Detailed description thereof will be omitted.

As illustrated in FIG. 12, an electric motor 120 includes the stator housing (first housing) 101, the first bearing housing (second housing) 102, the second bearing housing (second housing) 103, the rotary shaft 14 having the rotor 13, the stator 15, the first bearing 16, and the second bearing 17.

A motor assembling method according to the third embodiment has a step of inserting and fixing the stator 15 into the stator housing 101 through the opening 112, a step of finishing the inner peripheral surface 15a of the stator 15 located inside the stator housing 101, a step of inserting the rotary shaft 14, the first bearing 16, and the second bearing 17 into the stator housing 101, and fitting the outer peripheral surface 13a of the rotor 13 to the inner peripheral surface 15a of the stator 15, and a step of fixing the first bearing housing 102 to the opening 111, and fixing the second bearing housing 103 to the opening 112.

Specifically, the stator housing 101 is fixed using a jig (not illustrated), and the stator 15 is first fitted and fixed to the inner peripheral surface 101a of the stator housing 101 through the opening 112. Here, the inner peripheral surface 15a of the stator 15 fixed inside the stator housing 101 is subjected to finishing by a cutting device. In this manner, the inner peripheral surface 15a of the stator 15 secures roundness, and the center of the stator housing 101 and the center of the stator 15 coincide with each other. Next, the rotary shaft 14, the first bearing 16, the second bearing 17, and the second bearing housing 103 are inserted into and fixed to the stator housing 101 through the opening 112. In this case, the first bearing 16 and the second bearing 17 and the second bearing 17 are mounted on the respective support shafts 31 and 32 of the rotary shaft 14. The second bearing housing 103 is mounted on the second bearing 17 so as to form an assembly. The assembly is inserted into and fixed to the stator housing 101 through the opening 112.

That is, the rotor 13 of the rotary shaft 14 is located inside the stator 15. The outer peripheral surface 13a of the rotor 13 is fitted to the outer peripheral surface 15b of the stator 15. Therefore, the center of the rotor 13 of the rotary shaft 14 and the center of the stator 15 coincide with each other. Then, the second bearing housing 103 mounted on the opening 112 is fixed using the plurality of bolts 118. In addition, the first bearing housing 102 is mounted on the opening 111 so that the first bearing housing 102 is mounted on the first bearing 16, and is fixed thereto using the plurality of bolts 115. In this case, mounting holes formed in the respective bearing housings 102 and 130, through which the bolts 115 and 118 penetrate, are set to have the inner diameter larger than the outer diameter of the bolts 115 and 118, and the positions of the respective bearing housings 102 and 130 are not misaligned due to the fastening of the bolts 115 and 118.

In this way, in the motor assembling method according to the fourth embodiment, when the rotary shaft 14, the first bearing 16, and the second bearing 17 are inserted into the stator housing 101, the outer peripheral surface 13a of the rotor 13 is fitted to the inner peripheral surface 15a of the stator 15 so that the centering is performed on the rotor 13.

Therefore, the outer peripheral surface 13a of the rotor 13 is fitted to the inner peripheral surface 15a of the stator 15. In this manner, the rotor 13 and the stator 15 are concentrically arranged. A highly accurate coaxial degree between the rotor 13 and the stator 15 is ensured by improving assembling accuracy.

In the electric motor according to the present invention, the structures of the rotor or the stator are not limited to the structures according to the above-described respective embodiments. For example, in the present embodiment, the respective bearings 16 and 17 are configured to include the sleeves 41 and 43 and the bearings 42 and 44. However, the respective bearings 16 and 17 may be configured to include only the bearings 42 and 44 without using the sleeves 41 and 43.

In addition, as the centering jig 60, in the above-described embodiment, the pressing bolt is provided in addition to the shaft portion 61, the centering portion 62, and the flange portion 63. The pressing bolt 77 is an example of the pressing member according to the present invention, and the pressing member is not limited to the pressing bolt 77. For example, a first casing may be located along a vertical direction, and the stator may be inserted into the first housing by moving the stator downward in the vertical direction. In this manner, the stator may be pressed from above by the pressing member.

In addition, in the above-described embodiments, the assembling accuracy of the electric motor can be further improved by applying the third embodiment or the fourth embodiment to the first embodiment.

REFERENCE SIGNS LIST 10, 10A: electric motor
11: stator housing (first housing)
12: bearing housing (second housing)
13: rotor
13a: outer peripheral surface
14: rotary shaft
15: stator
15a: inner peripheral surface
16: first bearing
17: second bearing
21: housing body
21a: inner peripheral surface
21b: protrusion portion
22: closing portion
23: opening 24: first mounting opening (mounting portion)
28: second mounting opening (mounting portion)
31, 32: support shaft
33: stator body
34: first resin plate (first insulation member)
34a: inner peripheral surface
35: second resin plate (second insulation member)
35a: inner peripheral surface
41, 43: sleeve
41a, 43a: outer peripheral protrusion surface
45, 46: seal ring
51: thermal conduction member
60: centering jig
61: shaft portion
62: centering portion
63: flange portion
77: pressing bolt (pressing member)
81 fastening bolt
100: electric motor
101: stator housing (first housing)
102: first bearing housing (second housing)
103: second bearing housing (second housing)
111, 112: opening
113: first mounting opening (mounting portion)
116: second mounting opening (mounting portion)

The invention claimed is:

1. A motor assembling method for an electric motor including
    a first housing having an opening disposed on one side in an axial direction,
    a rotary shaft having a rotor, and located along the axial direction in a center portion inside the first housing,
    a stator located around the rotor inside the first housing,
    a second housing fixed to the opening, and
    a first bearing and a second bearing which are disposed in the first housing and the second housing, and which rotatably support each end portion of the rotary shaft in the axial direction,
    the method comprising:
    inserting the stator into the first housing through the opening;
    fitting a shaft portion of a centering jig to an inner peripheral surface of the stator and a mounting portion of the first bearing in the first housing, and fitting a flange portion to the opening;
    fixing the stator on which centering is performed using the centering jig to the first housing;
    removing the centering jig from the first housing; and
    inserting the rotary shaft, the first bearing, and the second bearing into the first housing, and fixing the second housing to the opening,
    wherein after the centering jig is inserted into the first housing, the stator is pressed against the first housing in the axial direction by a pressing member, and the stator is fixed to the first housing in this state, the pressing member being disposed in a disc portion of the flange portion.

2. The motor assembling method according to claim 1, wherein after the centering jig is inserted into the first housing, the stator is fixed to the first housing by filling a clearance between an outer peripheral surface of the stator and an inner peripheral surface of the first housing with a thermal conduction member.

3. The motor assembling method according to claim 1, wherein after the centering jig is inserted into the first housing, the stator is fixed to the first housing by a fastening bolt.

4. The motor assembling method according to claim 1, wherein in the stator, a first insulation member and a second insulation member which have a ring shape are fixed to each end portion in a stator body in the axial direction, and when the rotary shaft, the first bearing, and the second bearing are inserted into the first housing, the centering is performed on the rotor by fitting each outer peripheral surface of the first bearing and the second bearing to each inner peripheral surface of the first insulation member and the second insulation member.

5. The motor assembling method according to claim 4, wherein after the stator is inserted into the first housing, finishing is performed on each inner peripheral surface of the first insulation member and the second insulation member, and the rotary shaft, the first bearing, and the second bearing are inserted into the first housing.

6. The motor assembling method according to claim 1, wherein when the rotary shaft, the first bearing, and the second bearing are inserted into the first housing, the centering is performed on the rotor by fitting an outer peripheral surface of the rotor to the inner peripheral surface of the stator.

7. A centering jig used when assembling an electric motor including
    a first housing having an opening disposed on one side in an axial direction,
    a rotary shaft having a rotor, and located along the axial direction in a center portion inside the first housing,
    a stator located around the rotor inside the first housing,
    a second housing fixed to the opening, and
    a first bearing and a second bearing which are disposed in the first housing and the second housing, and which rotatably support each end portion of the rotary shaft in the axial direction,
    the centering jig comprising:
    a shaft portion fitted to an inner peripheral surface of the stator inserted into the first housing;
    a centering portion disposed in a tip portion of the shaft portion, and fitted to a mounting portion of the first bearing in the first housing; and
    a flange portion fitted to the opening,
    wherein after the centering jig is inserted into the first housing, the stator is pressed against the first housing in the axial direction by a pressing member, and the stator is fixed to the first housing in this state, the pressing member being disposed in a disc portion of the flange portion.

* * * * *